United States Patent
Shibata

(10) Patent No.: US 7,377,202 B1
(45) Date of Patent: May 27, 2008

(54) LIGHTED POWER TOOLS

(75) Inventor: Yoshinori Shibata, Anjo (JP)

(73) Assignee: Makita Corporation, Anjo-shi, Aichi-ken (JP)

( * ) Notice: Subject to any disclaimer, the term of this patent is extended or adjusted under 35 U.S.C. 154(b) by 0 days.

(21) Appl. No.: 09/570,035

(22) Filed: May 12, 2000

(30) Foreign Application Priority Data

May 14, 1999 (JP) ................................. 11-134514

(51) Int. Cl.
*B26D 7/00* (2006.01)
*B27B 5/29* (2006.01)
*B27B 5/20* (2006.01)

(52) U.S. Cl. ........................ 83/520; 83/490; 83/571.3; 362/89

(58) Field of Classification Search ................. 83/520, 83/471.2, 471.3, 490, 581; 362/89–91, 119; 408/16
See application file for complete search history.

(56) References Cited

U.S. PATENT DOCUMENTS

| 3,919,541 A | 11/1975 | Chao ........................... 362/120 |
| 3,977,278 A | 8/1976 | Jackson ...................... 81/57.11 |
| 4,257,297 A * | 3/1981 | Nidbella .................... 83/520 X |
| 4,769,747 A * | 9/1988 | Parrillo ......................... 362/89 |
| 5,169,225 A | 12/1992 | Palm ........................... 362/118 |
| 5,285,708 A | 2/1994 | Bosten et al. .................. 83/520 |
| 5,375,495 A * | 12/1994 | Bosten et al. .................. 83/520 |
| 5,473,519 A | 12/1995 | McCallops et al. ......... 362/120 |
| 5,634,711 A | 6/1997 | Kennedy et al. ............. 362/119 |
| 5,996,460 A * | 12/1999 | Waite ........................... 83/520 |
| 6,175,196 B1 | 1/2001 | Ragner et al. ........... 315/200 A |
| 6,318,874 B1 | 11/2001 | Matsunaga ................... 362/119 |
| 6,397,717 B1 * | 6/2002 | Waite ........................... 83/520 |
| 6,494,590 B1 | 12/2002 | Paganini et al. ............. 362/119 |
| 2001/0029819 A1 | 10/2001 | Okouchi ................... 83/520 X |

FOREIGN PATENT DOCUMENTS

| DE | 2529668 | 1/1977 |
| DE | 8521614.3 | 2/1986 |
| DE | 3831344 | 3/1990 |
| FR | 2523891 | 9/1983 |
| GB | 2305128 | 4/1997 |
| JP | 6098602 | 7/1985 |
| JP | 2512328 | 8/1991 |
| JP | 4-136621 | 12/1992 |
| JP | 6-701 | 1/1994 |
| JP | 11170203 | 6/1999 |

OTHER PUBLICATIONS

Japanese Catalog published Apri. 1998 by Hitachi Koki Kabushiki Kaisha.

* cited by examiner

*Primary Examiner*—Clark F. Dexter
(74) *Attorney, Agent, or Firm*—Dennison, Schultz & MacDonald

(57) ABSTRACT

A power tool includes a base for supporting a workpiece to be machined. A tool unit can move relative to the base and has a tool for machining the workpiece. A light projection device can project light onto the workpiece. A control device can control the light projection onto the workpiece in response to the position of the tool relative to the workpiece and/or in response to the illumination level of the workpiece.

28 Claims, 7 Drawing Sheets

LIGHTED POWER TOOLS

BACKGROUND OF THE INVENTION

1. Field of the Invention

The present invention relates to power tools, such as table saws, miter saws, slide-type miter saws and band saws, having a light source that can illuminate a portion of a workpiece.

2. Description of the Related Art

Miter saws are known that have a light for illuminating a workpiece, and in particular, onto a cutting line marked on the workpiece, which cutting line is generally a pencil mark. If the work area is dark or not well lit, the light can assist the operator to safely and easily adjust the workpiece position, so that the cutting line is aligned with the saw blade.

However, in known saws, the operator must manually operate a switch in order to turn the light on or off. Thus, the operator must turn the light on every time the light is necessary and then the operator must remember to turn off the light when the cutting operation is finished. If the operator forgets to turn off the switch after completing the cutting operation, the light may unnecessarily stay lit for a long time. Thus, power will be unnecessarily consumed and the light may prematurely burn out from overuse.

SUMMARY OF THE INVENTION

It is, accordingly, one object of the present invention to teach improved power tools.

In one aspect of the present teachings, power tools are taught in which the light operates automatically and the operator is not required to manually operate a light switch. Thus, power consumption can be reduced and the life of the light may be increased.

The light may be controlled, for example, according to the position of the tool relative to the workpiece. As the tool approaches the workpiece, the light may be turned on so that the operator can see both the tool and the workpiece when initiating the power tool operation. For example, a saw may include a device that turns on the light in response to the saw blade moving close to a board that will be cut.

In another aspect of the present teachings, a light detector may be provided that detects the amount of light in the work area around the workpiece. Thus, if the workpiece is already well lit, the light will not turn on, regardless of the position of the tool relative to the workpiece. However, if the light detector detects a low light level around the workpiece, the light can be turned on in order to assist the operator to see the workpiece during the power tool operation. For example, the operator can utilize the light to adjust the position of the workpiece before performing the power tool operation.

The power tool may also optionally include a device that turns off the light when illumination is no longer necessary. That is, after the operator has completed positioning the workpiece and has begun the power tool operation, the light can be safely turned off in order to reduce power consumption and increase the life of the light.

Thus, power tools are taught that have automatically controlled lights. Because the operator is not required to manually turn the light on and off, the power tool operation can be simplified and power consumption can be reduced.

Other objects, features and advantages of the present invention will be readily understood after reading the following detailed description together with the accompanying drawings and the claims.

DETAILED DESCRIPTION OF THE INVENTION

Figure 1:
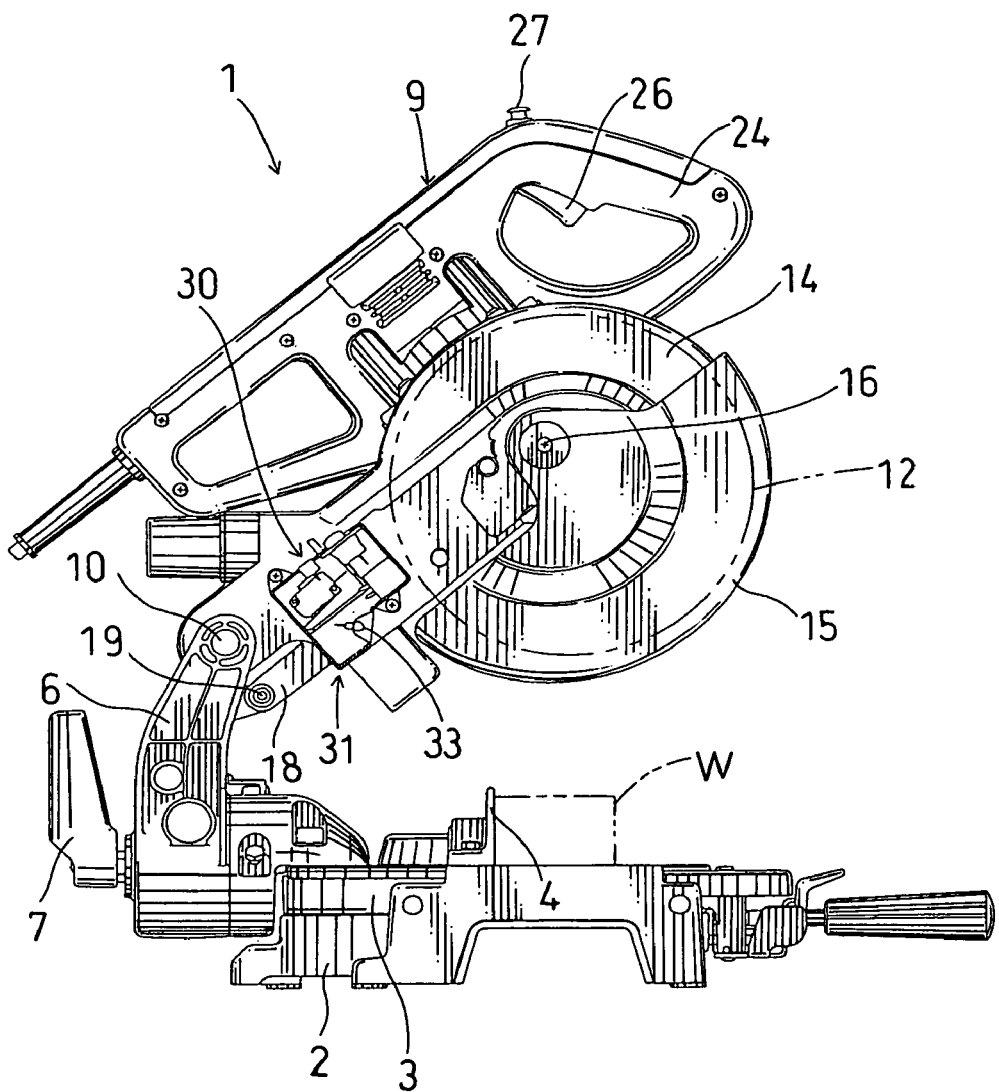
FIG. 1 is a side view of a representative miter saw, in which the saw unit is in the uppermost position.

Preferably, power tools may include a base for supporting a workpiece to be machined. A tool unit may move relative to the base and may have a tool for machining the workpiece. A light source is preferably disposed in a position on the power tool so as to illuminate the workpiece. Preferably, the light source is activated when the tool unit is moved close to the workpiece and the light source is deactivated when light is not necessary.

A lighting control unit may be provided in order to control the activation and deactivation of the light source in response to the position of the tool relative to the workpiece. Therefore, the light may be turned off if the tool moves away from the workpiece in order to reduce power consumption and extend the useable life of the light source.

Preferably, the tool unit can move between a first position for machining the workpiece using the tool and a second position that is away from the workpiece. Optionally, the workpiece may be set on or removed from the power tool base when the tool unit is in the second position. The light may be turned off when the tool unit is in the first and/or the second positions.

A third position may be defined between the first position and the second position. Preferably, when the tool unit passes through the third position, the light source may be activated or deactivated. Thus, the power tool may include a position detector that is coupled to the light. When the position detector detects that the tool unit has passed through the third position, a signal may be generated to either turn on the light or turn off the light.

The position detector may include a first switch and an operation member. The first switch may be connected to an electrical circuit having a power source. The operation member may serve to automatically turn on and off the first switch in response to changes in the position of the tool relative to the base. The first switch may be mounted on the tool unit, and the operation member may move relative to the tool unit between an "on" position and an "off" position for the first switch.

A light detector can be optionally provided with a second switch. The light detector may detect the illumination level around the base (i.e., the workpiece, if the workpiece has been set on the base). The second switch may be controlled by signals generated by the light detector. Thus, if the illumination level is relatively high and the operator does not require the light in order to clearly see the tool and the workpiece, the light detector can inactivate the second switch and the second switch can inactivate the light. On the other hand, if the illumination level is relatively low, the light detector can activate the second switch. In this case, the second switch will not affect the operation of the light.

The power tool may be a saw, such as a miter saw, and the tool unit may be a saw unit having a saw blade. In addition, the base for supporting the workpiece may include a fixed table or a turntable. As a result, the lighting control unit may control the light projection onto the workpiece in response to the position of the saw blade relative to the workpiece.

Preferably, the miter saw includes a safety cover and a link member associated with the safety cover. The link member may be operable to move the safety cover from a covered position, in which the saw blade is covered, to an uncovered position, in which the saw blade is uncovered, while the saw unit is moving from the first position to the second position.

The link member may also serve as the operation member for the lighting control unit. In such a case, it is not necessary to incorporate an additional member that will provide positional information to the lighting control unit. In addition, it is also not required to incorporate an actuator with the operation member. As a result, the lighting control unit can be easily constructed at a low cost.

Each of the additional features and method steps disclosed above and below may be utilized separately or in conjunction with other features and method steps to provide improved power tools and methods for designing and using such power tools. A representative example of the present invention, which example utilizes many of these additional features and method steps in conjunction, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe a representative example of the invention.

FIG. 1 depicts a representative miter saw 1 that may have a base 2 adapted to be set on a flat surface. A turntable 3 may be mounted on the base 2 and preferably can be rotated about a vertical axis. A fence 4 may be disposed on the base 2 so as to extend over the turntable 3 and thereby assist in positioning a workpiece W that is placed on the turntable 3. The turntable 3 may have an upper surface, which includes a blade slot (not shown) that can receive a lower portion of a circular saw blade 12 during the cutting operation.

A support arm 6 may be mounted on a rear end (left side end as viewed in FIG. 1) of the turntable 3, so that the support arm 6 can laterally pivot about a horizontal axis. Using a lever 7 and an associated tightening bolt (not shown), the support arm 6 can be fixed in any desired pivoted position, including the upright position shown in FIG. 1.

A saw unit 9 may be mounted on an upper end of the support arm 6 by means of a horizontal pivot shaft 10 so to pivot in the vertical direction, thereby permitting the saw unit 9 to move toward and away from the turntable 3 in the vertical direction. A return spring (not shown) may be disposed between the support arm 6 and the saw unit 9, so that the saw unit 9 can be biased upward toward the resting (e.g., uppermost) position shown in FIGS. 1 and 2. Thus, the saw unit 9 can vertically and reciprocally pivot relative to the turntable 3.

A motor having a reduction gear mechanism (not shown) may be mounted within the right side of saw unit 9 (i.e., behind the saw unit 9 shown in FIG. 1). A circular saw blade 12 may be removably mounted on the output shaft of the reduction gear mechanism. The saw unit 9 may have a blade case 14 that covers substantially the upper half of the saw blade 12.

Figure 2:
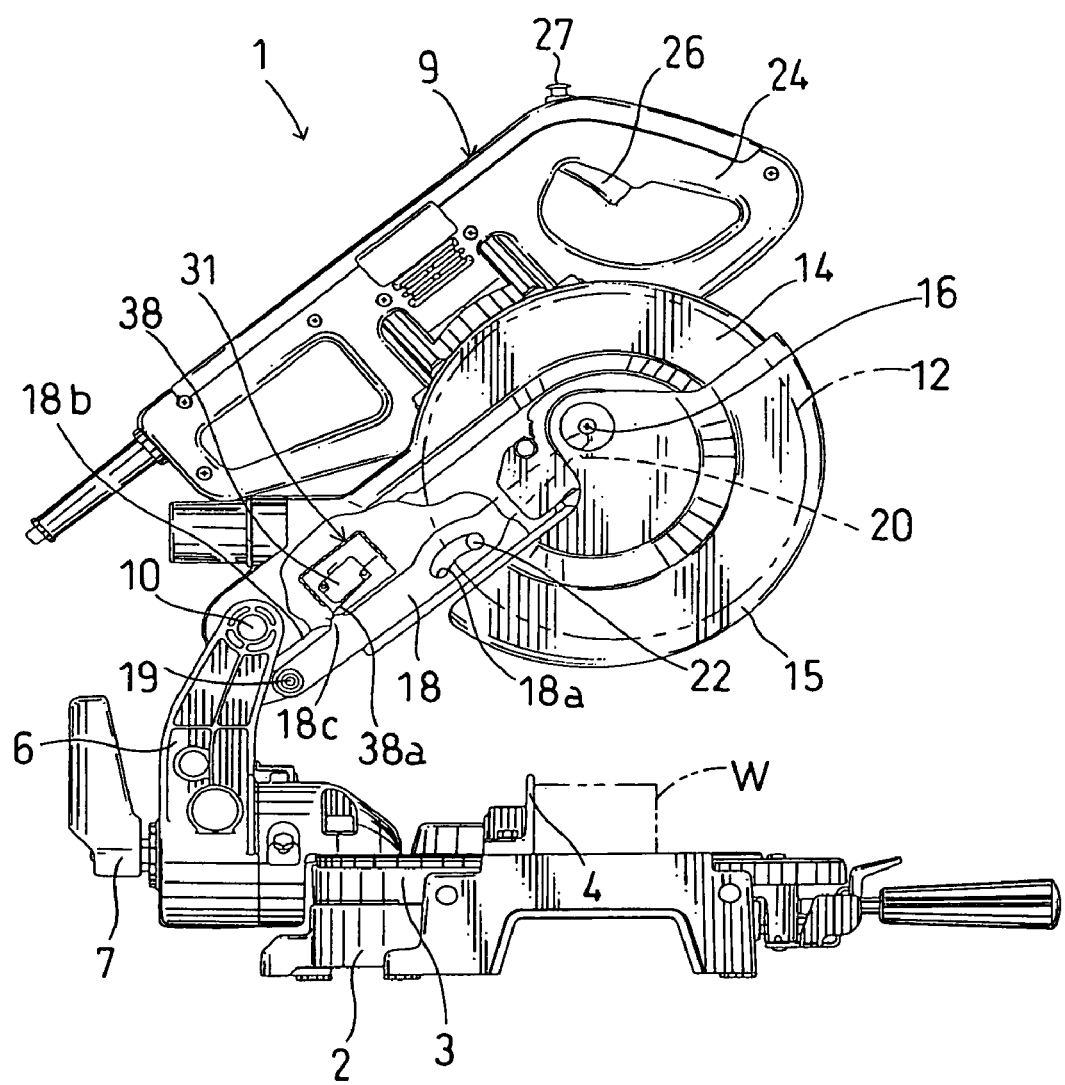
FIG. 2 is another side view of the representative miter saw, in which the interior of the lighting unit 30 is shown.

A substantially fan-shaped safety cover 15 may be rotatably mounted on the blade case 14 by means of a support pin 16, so that the safety cover 15 can rotate within a predetermined angle and thus, cover and uncover the exposed lower half of the saw blade 12. A cover returning spring (not shown) may be provided between the blade case 14 and the safety cover 15, so that the safety cover 15 is biased to cover the blade 12 when the saw 1 is not in use, as shown in FIGS. 1 and 2.

In order to automatically open and close the safety cover 15 in response to vertical pivotal movement of the saw unit 9, a link arm 18 may be associated with the safety cover 15. As shown in FIG. 2, one end (the lower end as viewed in FIG. 2) of the link arm 18 is pivotally connected to the support arm 6 by means of a pivot pin 19. The other end (the upper end as viewed in FIG. 2) may contact a stopper plate 20 that is fixed within the safety cover 15.

Figure 3:
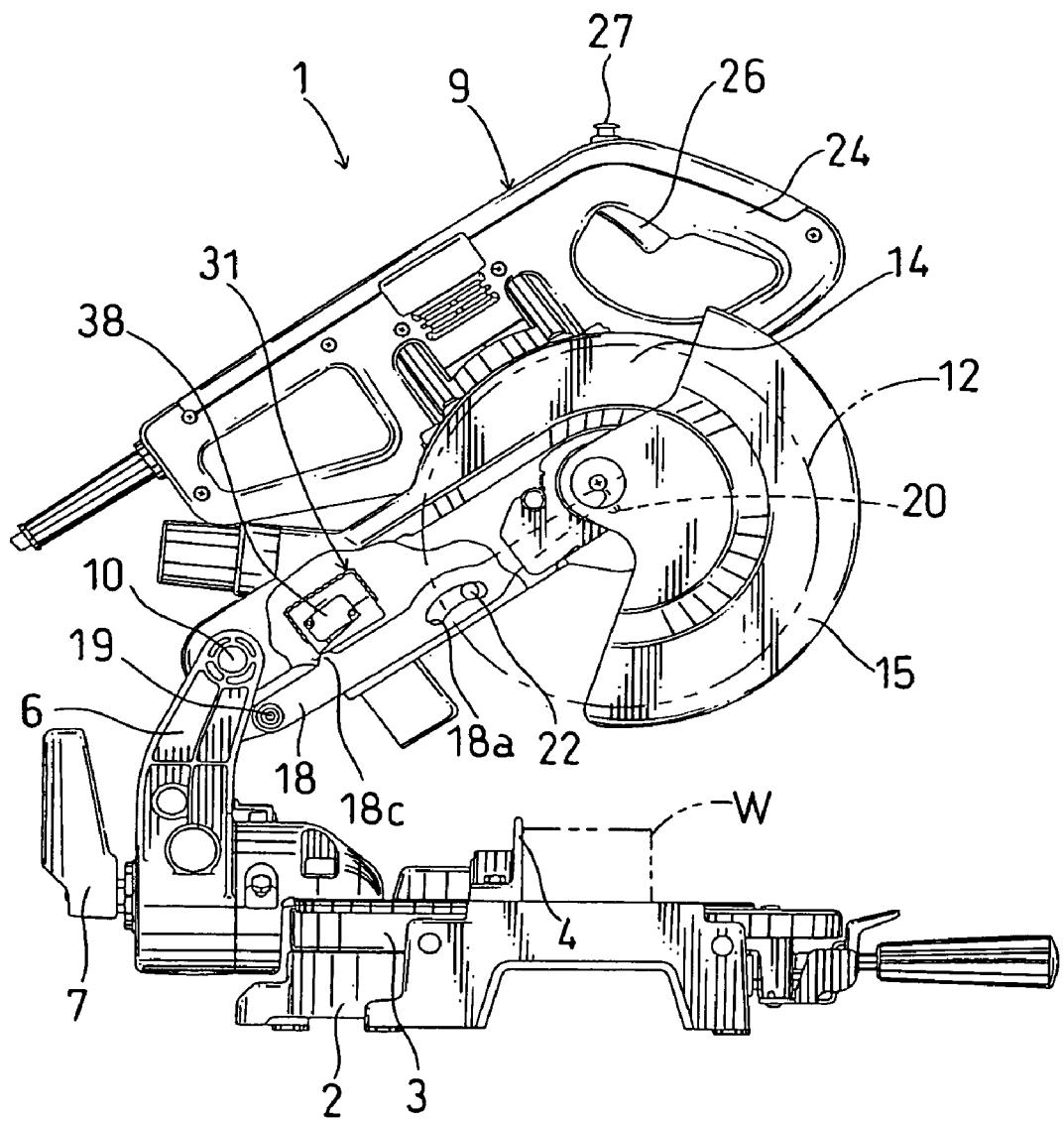
FIG. 3 is another side view of the representative miter saw, in which the saw unit has been pivoted to a position for adjusting the position of the workpiece.
Figure 4:
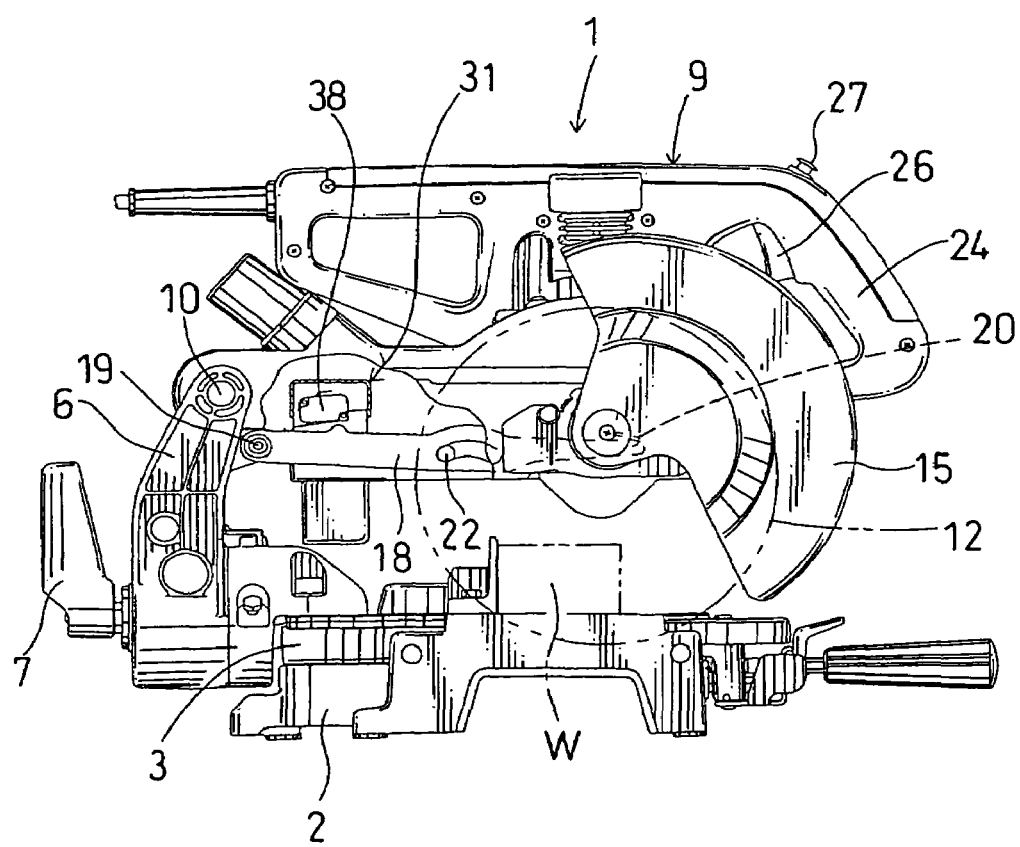
FIG. 4 is another side view of the representative miter saw, in which the saw unit has been further pivoted to the lowermost position.

A substantially arc-shaped guide slot 18a may be formed in the middle portion of the link arm 18. A guide pin 22 may be fixed within the blade case 14 in a position away from the stopper plate 20 in a radial direction and may engage the guide slot 18a. Therefore, as the saw unit 9 vertically pivots, the guide pin 22 moves along the guide slot 18a of the link arm 18, so that the link arm 18 pivots about the support pin 19. Then, the link arm 18 urges the safety cover 15 to rotate in the counterclockwise direction against the biasing force of the cover return spring due to the upper end of the link arm 18 contacting the stopper plate 20. Thus, the safety cover 15 will rotate to uncover the lower half of the saw blade 12 as shown in FIGS. 3 and 4.

The saw unit 9 may further include a handle 24 that can be held by an operator. A switch 26, such as a lever switch or trigger switch, may be mounted on the handle 24. Typically, the operator can activate this switch 26 in order to start and stop the motor and thus the blade rotation. A lock button 27 also may be mounted on the handle 24 and may serve to lock the switch 26 in the "on" or motor starting position.

As shown in FIG. 1, a lighting unit 30 may be mounted on the saw unit 9. The lighting unit 30 may include a casing 31 that is mounted on the saw unit 9 in a position that is between the pivot shaft 10 and the support pin 16, such that the casing 31 is positioned adjacent to the rear portion of the saw blade 12.

Figure 5:
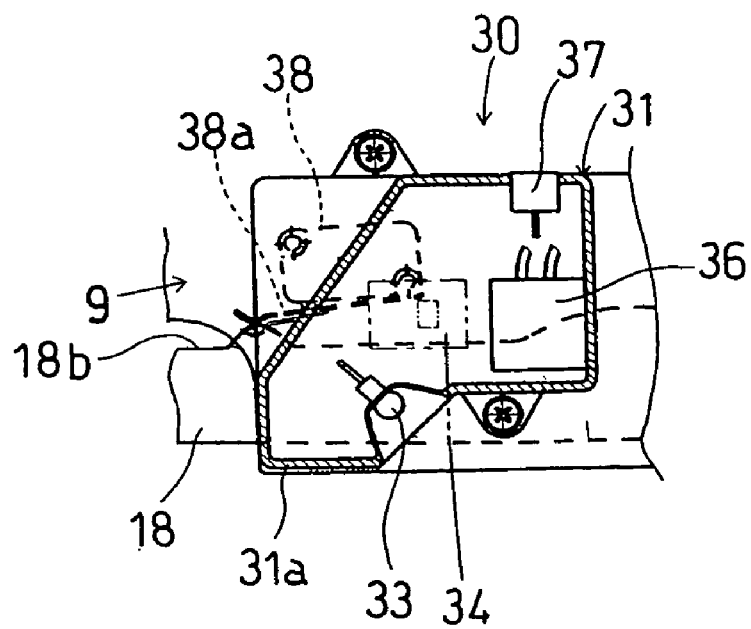
FIG. 5 is an enlarged sectional view of a representative lighting unit.

As shown in FIG. 5, a light source 33, such as an incandescent light bulb, may be mounted on a bottom plate 31a of the casing 31 and may partially protrude through the casing 31a. Thus, the light source 33 can light a workpiece W (see FIG. 1) that is placed on the turntable 3. A main switch 34 may be mounted on an outer side plate (not shown) of the casing 31 and can be utilized to turn the light source 33 on and off. A circuit board 36, light detector 37 and a flash switch 38 also may be mounted within the casing 31.

The light detector 37 may detect the amount or level of light in the area around the casing 31 and/or around the workpiece W placed on the turntable 3. The flash switch 38 may include a normally-closed type limit switch and may have a spring-biased pivotal lever 38a. The pivotal lever 38a may have a lower end that normally contacts an upper edge 18b of the link arm 18. As described above, the link arm 18 can pivot about the support pin 19 in response to vertical pivotal movement of the saw unit 9. Therefore, the link arm 18 can move relative to the saw unit 9, so that the pivotal lever 38a of the flash switch 38 pivots when the saw unit 9 pivots.

The flash switch 38 may change from the "on" state to the "off" state when the pivotal lever 38a pivots upward beyond a certain position. The designer can define this position. In a preferred embodiment, a substantially semicircular projection 18c is formed on the upper edge 18b of the link arm 18 to suitably control the on/off state of the flash switch 38.

Figure 9:
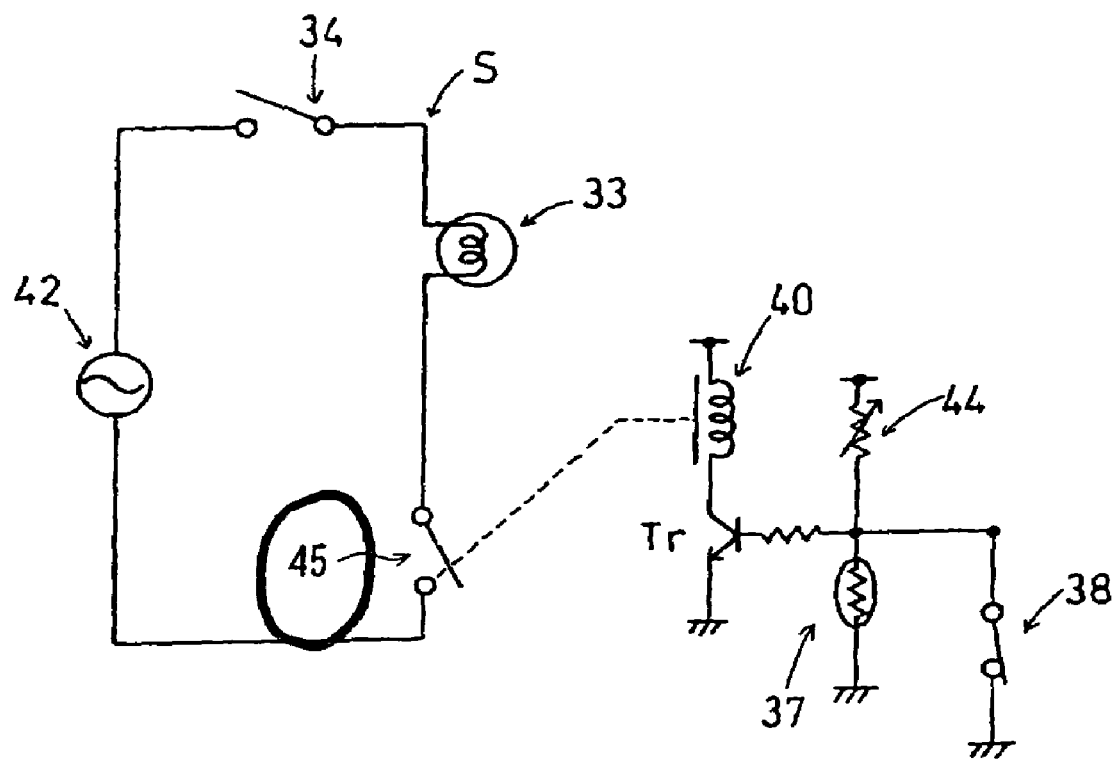
FIG. 9 is a representative light control circuit.

The light source 33, the main switch 34, the light detector 37 and the flash switch 38 may be electrically connected to form a lighting control circuit S as shown in FIG. 5. As shown in further detail in FIG. 9, the representative lighting control circuit S also includes switch 45, which may include a relay 40 connected in series between a power source 42 and the main switch 34. A bipolar transistor Tr may be connected to the relay 40. A voltage may be applied to the base of transistor Tr via the flash switch 38 and the light detector 37. The light detector 37 can be, for example, a CdS photocell. When the illumination level detected by the light detector 37 is less than a defined illumination level, or when the resistance of the light detector 37 exceeds a certain resistance value, the voltage applied to the base of the transistor Tr will exceed its threshold voltage, thereby causing the transistor Tr to conduct. As a result, the relay 40 will close. The designer can select appropriate illumination levels and resistance values to suit the particular design parameters.

Therefore, according to the representative lighting control circuit S, the light source 33 will not be turned on unless (1) the main switch 34 is turned on and (2) the relay 40 is closed. In addition, the relay 40 will not close unless (3) the flash switch 38 is turned on and (4) the transistor Tr is turned on. In order to adjust the voltage from the light detector 37 that is applied to the base of the transistor Tr, or in order to adjust the sensitivity of the detector 37, a variable resistor 44 may be provided in series with the light detector 37. Consequently, the relay 40 can serve as a switch that will turn on and off in response to the illumination level detected by the light detector 37.

The operation of the above embodiment will now be described in connection with the cutting operation of the workpiece W.

First, when the saw unit 9 is in the uppermost position shown in FIG. 1, the workpiece W is placed on the turntable 3, such that the rear portion of the workpiece W contacts the fence 4. Then, the handle 24 is pressed downward against the biasing force of the return spring so as to pivot the saw unit 9 to the intermediate position shown in FIG. 3 (hereinafter called "the workpiece adjusting position"), in which the saw blade 12 is positioned just above the workpiece W. In this intermediate position, the operator can adjust the position of the workpiece W in order to align a cutting line, such as a pencil mark previously marked on the workpiece W, with the saw blade 12. That is, the workpiece W may be moved along the fence 4 and/or the turntable 3 can be rotated in order to adjust the position of the workpiece W relative to the saw blade 12.

After the position of the workpiece W has been appropriately adjusted, the switch 26 is activated to start the motor and the handle 24 is further pressed to pivot the saw unit 9 downward from the intermediate position in order to thereby cut the workpiece W.

In the meantime, as the saw unit 9 pivots downward from the uppermost position, the link arm 18 (see FIG. 2) pivots in a clockwise direction about the support pin 19 under the control of the guide slot 18a and the guide pin 22 that engages the guide slot 18a. Therefore, the upper end of the link arm 18 presses against the contact plate 20 of the safety cover 15 to rotate the safety cover 15 in a counterclockwise direction against the cover return spring. As a result, the safety cover 15 uncovers the exposed lower portion of the saw blade 12 as shown in FIG. 3. When the saw unit 9 further pivots from the intermediate position shown in FIG. 3 to a lower position, in which the saw blade 12 contacts the workpiece W, the exposed lower half of the saw blade 12 may be substantially uncovered by the safety cover 15.

As a result, the saw blade 12 will cut the workpiece W along the cutting line and will partially enter the blade slot formed in the upper surface of the turntable 3 when the saw unit 9 has pivoted to the lowermost position shown in FIG. 4. Also, when the saw unit 9 reaches the lowermost position, the upper end of the link arm 18 will no longer apply a rotational force to the safety cover 15 via the contact plate 20, because the contact plate 20 extends substantially parallel to the link arm 18 in this position.

After completing the cutting operation, the operator releases the handle 24, so that the saw unit 9 automatically returns to the uppermost position due to the biasing force of the return spring. Also, the safety cover 15 returns to again cover the saw blade 12 due to the biasing force of the cover return spring that is applied in response to the return movement of the link arm 18 in order to follow the upward pivotal movement of the saw unit 9.

On the other hand, the light source 33 of the lighting unit 30 is activated and deactivated in response to the pivotal movement of the saw unit 9. In order to activate the lighting unit 30, the operator turns on the main switch 34.

Figure 6:
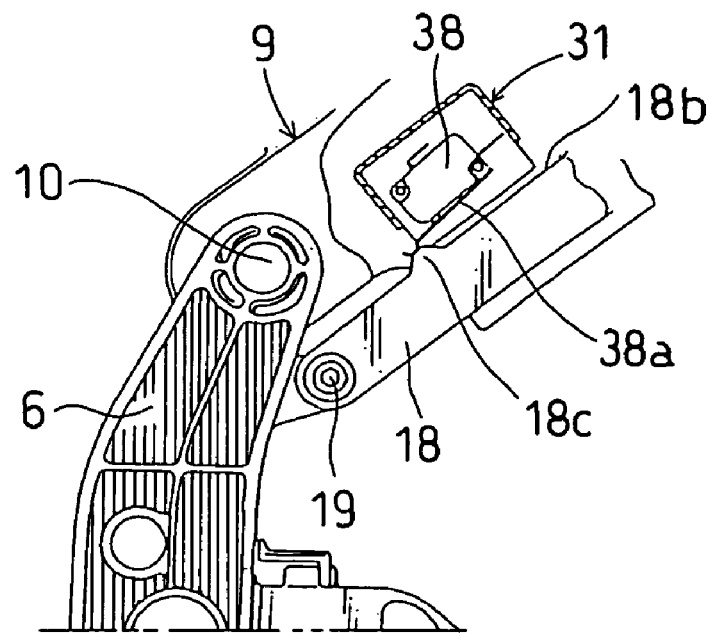
FIG. 6 is an enlarged view of a portion of FIG. 2, wherein the saw unit is in an uppermost position as shown in FIG. 1.

When the saw unit 9 is in the uppermost position shown in FIG. 2, pivotal lever 38a of the flash switch 38 contacts the projection 18c of the upper edge 18a of the link arm 18 as shown in FIG. 6, so that pivotal lever 38a is lifted above the predefined threshold pivot position. Therefore, in this position, the flash switch 38 is turned off. As a result the light source 33 will not shine.

Figure 7:
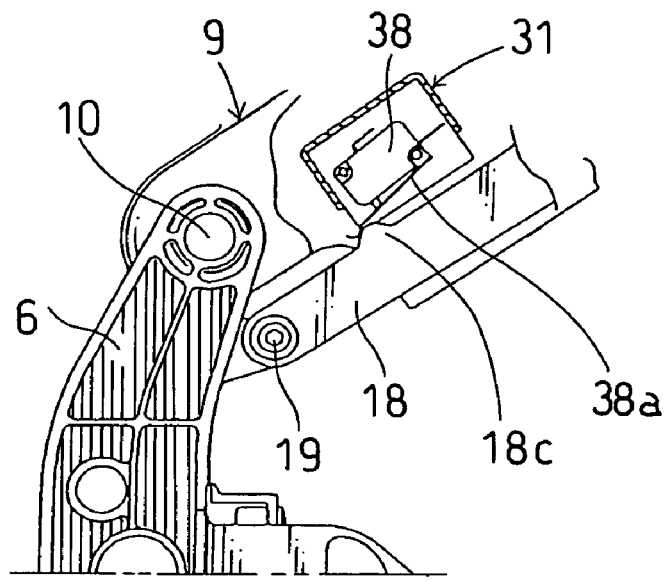
FIG. 7 is an enlarged view of a portion of FIG. 2, wherein the saw unit is in a workpiece adjusting position as shown in FIG. 3.

When the saw unit 9 has been pivoted downward to the intermediate position shown in FIG. 7, the pivotal lever 38a goes below the predefined threshold pivot position as shown in FIG. 3, so that the flash switch 38 is turned on. However, the light source 33 still will not shine if the illumination level detected by the light detector 37 is higher than a predefined level. Thus, if the workplace environment or the surrounding of the workpiece W has enough light to allow the operator to easily and safely perform the workpiece position adjusting operation, the light source 33 is not required to be activated. The designer can define an appropriate illumination level or a manually adjustable knob can be provided to permit the operator to adjust the threshold level for turning on the light source 33.

However, if the illumination level detected by the light detector 37 is less than the predefined level, e.g., if the workplace environment or the workpiece area is relatively dark, the relay 40 is closed by means of the transistor Tr. As a result, the light source 33 shines onto the workpiece W, and in particular shines on the portion of the workpiece W that has the cutting line. Therefore, the operator can easily and safely perform the workpiece position adjusting operation.

Figure 8:
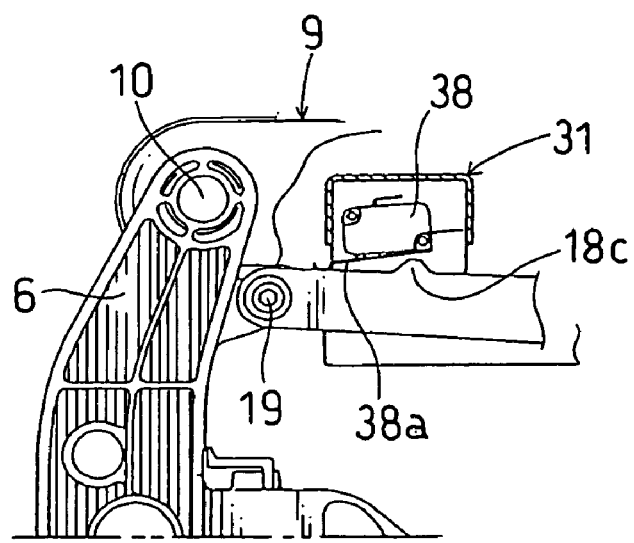
FIG. 8 is an enlarged view of a portion of FIG. 2, wherein the saw unit is in a lowermost position as shown in FIG. 4.

The flash switch 38 remains on until the saw unit 9 reaches the lowermost pivot position as shown in FIG. 4, where the pivotal lever 38*a* is lifted by the upper edge 18*b* of the link arm 18 above the predefined pivot position as shown in FIG. 8. As a result, the light source 33 will not shine even if the illumination level detected by the light detector 37 is below the predefined level. This optional feature can be utilized to reduce power consumption. Because the saw blade 12 has already begun cutting the workpiece W, it is no longer necessary to continue to provide an artificial light source, because the rest of the cutting operation can be performed without additional light. Thus, in this representative embodiment, the lighting unit 30 is designed such that the light source 33 only shines during the workpiece position adjustment operation, which is when the operator must see the blade and the cutting line in order to make an appropriate cut.

Preferably, the influence of the light from the light source 33 on the light detector 37 is minimized by incorporating a known circuit, such as a latch circuit and a timer circuit, into the representative lighting control circuit S. As a result, the light source 33 will continue to shine even though the detected illumination level may exceed the predefined level due to the light from the light source 33. Therefore, the light source 33 will continuously shine during the workpiece position adjustment operation.

Therefore, according to the preferred embodiment described above, as the saw unit 9 pivots downwardly from the uppermost position to the workpiece adjusting position or the intermediate position shown in FIG. 3, the light source 33 of the lighting unit 30 automatically turns from off to on, so that the operator can easily perform the workpiece position adjusting operation. Conversely, the light source 33 of the lighting unit 30 can automatically turn from on to off when the saw unit 9 has been pivoted upwardly from the intermediate position after the workpiece position adjusting operation and the cutting operation have been completed. Therefore, the operator is not required to manually turn on and off a switch, thereby reducing power consumption. As a result, the lighting operation of the workpiece W can be efficiently performed.

According to this representative embodiment, the light source 33 is mounted on the saw unit 9 and moves vertically together with the saw unit 9. Therefore, as the saw unit 9 pivots downwardly from the uppermost position, the light source 33 approaches the workpiece W, so that the light can be effectively projected on the workpiece W when the saw unit 9 reaches the intermediate position. Further, this arrangement ensures that the light is not obstructed in the space just above the turntable 3 when the saw unit 9 is in the uppermost position. Therefore, the operator can easily set the workpiece W onto the turntable 3 and remove the workpiece W from the turntable. Additionally, the workpiece W can be set and removed without causing any unintentional damage to the light source 33. However, the light source 33 can also be disposed on the turntable 3 or the fixed base 2.

Because the movement of the link arm 18 relative to the saw unit 9 in response to the vertical pivotal movement of the saw unit 9 is utilized to control the light source 33, it is not necessary to incorporate an additional actuation device that is used exclusively for this purpose. Therefore, this arrangement is advantageous in that manufacturing costs can be reduced.

Further, in the representative embodiment, the light source 33 automatically goes off when the saw unit 9 moves from the workpiece adjusting position or the intermediate position to the lowermost position. Therefore, power consumption can be further minimized. In addition, this arrangement is advantageous because unintentional consumption of power can be reliably avoided, in particular, when the miter saw 1 is stored with the saw unit 9 in the lowermost position. Thus, the light source 33 will not be activated in this position. Further, this design is particularly useful for battery powered miter saws, because this design minimizes power consumption. Moreover, this design is advantageous in that the light source 33 is only activated if the illumination level of the workplace and/or the workpiece is low, thereby further minimizing power consumption.

The light source 33 is naturally not limited to an incandescent bulb, as described in the representative embodiment and may be any appropriate source of light, such as an LED. Further, a variety of light detectors may be utilized, such as a photodiode.

Moreover, the present teachings are applicable to a variety of miter saws, such as miter saws having a saw unit that can slide horizontally relative to a turntable or a fixed table. Naturally, the present teachings are applicable to other kinds of power tools, such as drilling tools, fluting tools and abrading or polishing tools for machining either wooden or metal workpieces. switch is actuated by the position detector upon detection of the tool unit having reached the third position, thereby causing the light source to illuminate the table.

The invention claimed is:

1. An apparatus comprising:
    a table arranged and constructed to support a workpiece,
    a tool unit movably coupled to the table, the tool unit comprising a tool arranged and constructed to machine the workpiece,
    a position detector disposed on the tool unit, the position detector being arranged and constructed to detect that the tool unit is at a predetermined position at which the tool is spaced from the table during movement of the tool unit toward the table, and
    a light source coupled to the position detector, wherein the light source is arranged and constructed so as to illuminate a machining area of the table, whereby as the tool unit is moved toward the table, the position detector detects that the tool unit is at the predetermined position and causes a signal to be sent to the light source to activate or deactivate the light source so that the light source is capable of being activated or deactivated prior to machining the workpiece.

2. An apparatus as in claim 1, wherein the tool unit is arranged and constructed to move between a first position and a second position with respect to the table, the first position being closest to the table and the second position being farthest from the table, and wherein the predetermined position is defined between the first and second positions.

3. An apparatus as in claim 2, wherein the position detector includes a first switch, wherein the first switch is coupled to a power source and the light source, and wherein the first switch is actuated upon detection of the tool unit having reached the predetermined position, thereby causing the signal to be sent to the light source.

4. An apparatus as in claim 3, wherein the position detector and the light source are disposed on the tool unit.

5. An apparatus as in claim 4, further comprising:
    an ambient light detector arranged and constructed to detect an illumination level of the table before illumination by the light source, the ambient light detector being disposed on the tool unit, and a second switch coupled to the ambient light detector, the power source and the light source, wherein the second switch only permits illumination of the light source when the detected illumination level is less than a pre-determined illumination level.

6. An apparatus as in claim 5, further comprising means for adjusting the pre-determined illumination level coupled to the ambient light detector.

7. An apparatus as in claim 6, further comprising a manually operable third switch coupled to the light source and the power source, wherein deactivation of the third switch prevents illumination of the light source.

8. An apparatus as in claim 7, wherein the light source comprises an incandescent light or a light emitting diode.

9. An apparatus as in claim 8, wherein the light source is deactivated upon detection by the position detector of the tool unit reaching the first position.

10. An apparatus as in claim 9, wherein the light source is deactivated upon detection by the position detector that the tool unit has reached the predetermined position as it is moving away from the table.

11. A saw comprising:
a table arranged and constructed to support a workpiece,
a saw unit comprising a saw blade,
means for movably coupling the saw unit to the table, wherein the saw unit can pivot between a first position, in which the saw unit is disposed closest to the table, and a second position, in which the saw unit is disposed farthest from the table,
means for detecting that the saw unit is at a predetermined positionat which the saw blade is spaced from the table during movement of the saw unit towards the table, the detecting means being disposed on the saw unit,
a light disposed on the saw unit, the light being directed so as to illuminate the saw blade and a sawing area of the table upon activation of the light, and
means for controlling activation and deactivation of the light, the controlling means being coupled to the detecting means and the light, wherein the controlling means sends a signal to the light to activate or deactivate the light when the detecting means detects that the saw unit is at the predetermined position during movement of the saw unit toward to the table so that the light is capable of being activated or deactivated prior to sawing the workpiece.

12. A saw as in claim 11, wherein the predetermined position is between the first and second positions.

13. A saw as in claim 11, wherein the detecting means, the light and the controlling means are mounted on the saw unit.

14. A saw as in claim 11, wherein the controlling means further comprises means for detecting ambient light, wherein the ambient light detecting means only permits activation of the light when the detected ambient light is less than a pre-determined ambient light level.

15. A saw as in claim 14, wherein the controlling means further comprises means for adjusting the pre-determined ambient light level, the adjusting means being coupled to the ambient light detecting means.

16. A saw as in claim 11, further comprising a manually operable switch coupled between a power source and the light, wherein the light can be selectively activated only when the manually operable switch is actuated.

17. A saw as in claim 11, wherein the coupling means also permits lateral pivotal movement of the saw unit with respect to table, thereby enabling the saw blade to perform bevel cutting operations.

18. A saw comprising:
a table arranged and constructed to support a workpiece,
a saw unit comprising a saw blade,
first means for enabling the saw unit to vertically pivot with respect to the table,
second means for detecting that the saw unit is at a predetermined position at which the saw blade is spaced from the table during pivotal movement of the saw unit toward to the table, the second means being disposed on the saw unit,
third means for illuminating the saw blade and a sawing are of the table, the third means being disposed on the saw unit, and
fourth means for sending a signal to the third means to activate or deactivate the third means upon detection by the second means that the saw unit is at the predetermined position during the pivotal movement of the saw unit toward the table so that the third means is capable of being activated or deactivated prior to sawing the workpiece, the fourth means being coupled to the second means, the third means and a power source.

19. A saw as in claim 18, wherein the first means also permits lateral pivotal movement of the saw unit with respect to table, thereby enabling the saw blade to perform bevel cutting operations.

20. A saw as in claim 19, further comprising a manually operable fifth means for selectively coupling the power source to the third means, wherein the fifth means prevents activation of the third means when the fifth means is deactivated.

21. A saw as in claim 20, further comprising sixth means for detecting an illumination level of the table before activation of the third means, wherein the sixth means is coupled to the third means and only permits activation of the third means when the detected illumination level is less than a pre-determined illumination level.

22. A saw as in claim 21, further comprising seventh means for adjusting the pre-determined illumination level coupled to the sixth means.

23. A saw as in claim 22, wherein the first means permits the saw unit to pivot between a first position, in which the saw unit is disposed closest to the table, and a second position, in which the saw unit is disposed farthest from the table, and wherein the predetermined position is a position between the first position and the second position.

24. A saw as in claim 23, wherein the second means, the third means and the fourth means are disposed on the saw unit.

25. A saw as in claim 24, wherein the fifth means, the sixth means and the seventh means are also disposed on the saw unit.

26. An apparatus comprising:
a base arranged and constructed to support a workpiece,
a tool unit movably coupled to the base, the tool unit comprising a tool for machining the workpiece,
an illumination device positioned on the tool unit so as to illuminate the tool and a machining the workpiece of the base upon activation of the illumination device,
a position detector for detecting movement of the tool unit when the tool is spaced from the base as the tool moves towards the base so that the illumination device is capable of being activated prior to machining the workpiece, a light sensor, and a controller coupled to the illumination device, the position detector and the light sensor, the controller selectively activating the illumination device in response to
  (1) detection by the position detector that the tool unit is at a predetermined position during movement of the tool unit toward the base, and
  (2) detection by the light sensor that an illumination level of the base is less than a pre-determined illumination level before activation of the illumination device.

27. An apparatus as in claim 26, wherein the controller is arranged and constructed to deactivate the illumination device upon detection by the position detector of the tool unit reaching a position closest to the base.

28. An apparatus as in claim 26, wherein the controller is arranged and constructed to deactivate the illumination device upon detection by the position detector of the tool unit reaching the predetermined position as it is moving away from the base.

* * * * *